No. 690,655. Patented Jan. 7, 1902.
SYED ALI MOHAMMED KHAN.
CANE.
(Application filed July 19, 1901.)
(No Model.)
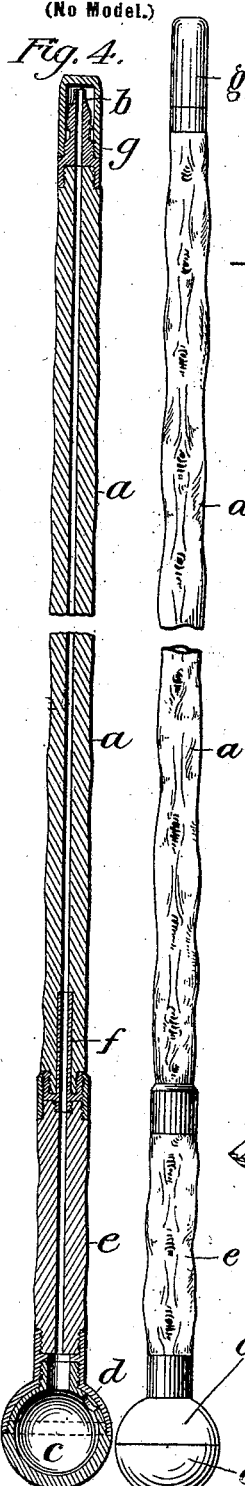
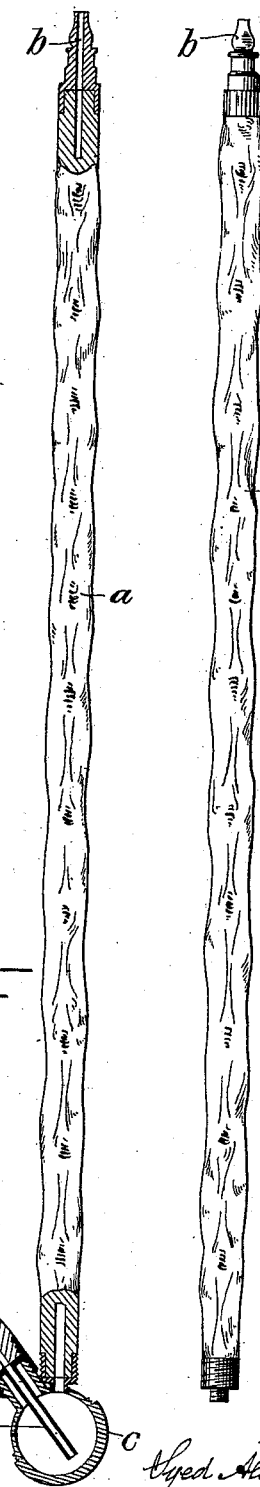
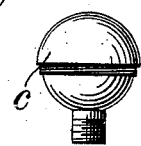
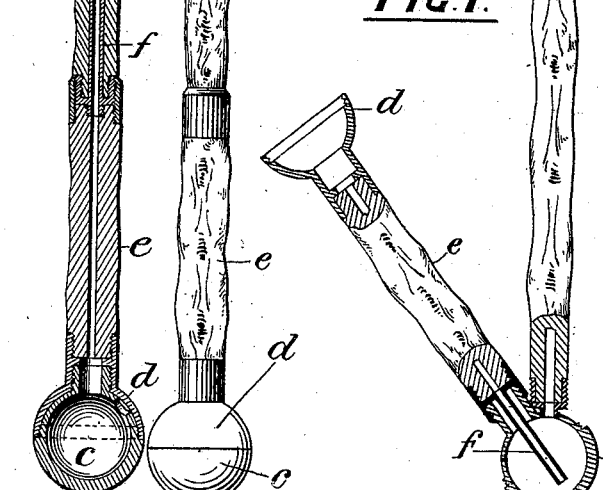
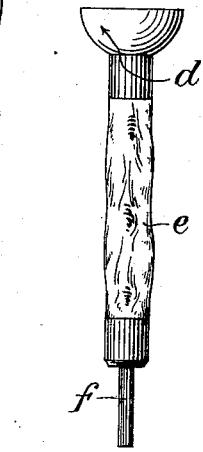
Witnesses:
Henry Thieme.
George Barry Jr.
Inventor-
Syed Ali Mohammed Khan
By attorneys
Robert H Seward

UNITED STATES PATENT OFFICE.

SYED ALI MOHAMMED KHAN, OF LONDON, ENGLAND.

CANE.

SPECIFICATION forming part of Letters Patent No. 690,655, dated January 7, 1902.

Application filed July 19, 1901. Serial No. 68,869. (No model.)

*To all whom it may concern:*

Be it known that I, SYED ALI MOHAMMED KHAN, a subject of the King of Great Britain, Emperor of India, residing at Mitre Chambers, Temple, London, England, have invented new and useful Improvements in Hookas, of which the following is a specification.

The present invention has for its object so to construct a hooka for smoking tobacco that it can be readily taken to pieces and built up again into the form of a stick—a walking-stick, for example.

In the accompanying drawings I have shown my invention as adapted to form a walking-stick.

Figure 1 shows the hooka ready for use, partly in section. Fig. 2 represents outside views of its separated parts. Fig. 3 is an outside view of the parts built up again into a walking-stick; Fig. 4, a central longitudinal section of the walking-stick.

Referring first to Fig. 1, $a$ is the hollow stem of the hooka, provided with a mouthpiece $b$. This stem is detachably affixed—by screwing, for example, as shown—to a bulb $c$, which is intended to contain water or other purifying liquid used in hookas.

$d$ is the bowl for the tobacco or other material to be smoked. This bowl is mounted on the end of a short stem $e$, which is also detachably fitted to the bulb $c$.

$f$ is a small tube extending from the stem $e$ into the bulb $c$ beneath the water or liquid level, so that the smoke must pass through the said liquid.

In converting the hooka into a stick the stems $a$ and $e$ are detached from the bulb $c$, as shown in Fig. 2, the bowl remaining attached to the stem $e$. The bulb is then inserted into the bowl $d$ and screwed thereto, and thus connected with the corresponding end of the stem $e$ and at the same time made to close the mouth of the bowl. The end of the stem $e$, previously described as attached to the bulb, is then screwed to that end of the stem $a$ which had been attached to the bowl, the tube $f$ then entering the said stem $a$, which is bored to receive it, and a cap or ferrule $g$ is fitted over the mouthpiece. All of this is shown in Fig. 4, wherein it is also shown that the bowl so conforms to and receives the bulb that the two combine to form a knob or handle to the stick. The ferrule $g$ is the only part which is not in active use both in the hooka and in the stick. It will thus be seen that the stick is complete and can be used as such when not required as a hooka. The latter is therefore rendered exceedingly portable and is always at hand for use when required.

What I claim as my invention, and desire to secure by Letters Patent, is—

A convertible hooka composed of detachable parts comprising a bowl for the material to be smoked, a bulb for purifying liquid having two apertures, a stem having a mouthpiece and fitted to one of said apertures, and a second stem forming a communication between the bowl and the other of said apertures, the said stems being provided with means for connecting them together end to end and the bulb being shaped to fit the bowl and close its mouth for the conversion of the hooka into a stick, substantially as herein described.

In testimony whereof I have signed my name to this specification in the presence of two subscribing witnesses.

SYED ALI MOHAMMED KHAN.

Witnesses:
ALFRED S. BISHOP,
FRED C. HARRIS.